United States Patent [19]

Goldberg et al.

[11] Patent Number: 5,150,969
[45] Date of Patent: Sep. 29, 1992

[54] SYSTEM AND METHOD FOR TEMPERATURE DETERMINATION AND CALIBRATION IN A BIOMEDICAL PROBE

[75] Inventors: Jack Goldberg, San Diego; Robert J. Rosati, Carlsbad, both of Calif.

[73] Assignee: IVAC Corporation, San Diego, Calif.

[21] Appl. No.: 729,866

[22] Filed: Jul. 10, 1991

Related U.S. Application Data

[63] Continuation of Ser. No. 492,655, Mar. 12, 1990, abandoned.

[51] Int. Cl.[5] ............................. G01J 5/18; A61B 5/00
[52] U.S. Cl. ................................... 374/128; 374/129; 128/664; 364/557
[58] Field of Search ............... 364/557; 374/128, 129, 374/130, 131, 126; 356/43-45; 128/736, 664

[56] References Cited

U.S. PATENT DOCUMENTS

| | | | |
|---|---|---|---|
| 2,696,117 | 6/1950 | Harrison | 73/355 |
| 4,301,682 | 11/1981 | Everest | 73/355 R |
| 4,433,923 | 2/1984 | Rascati et al. | 374/129 |
| 4,456,919 | 6/1984 | Tomitol et al. | 374/128 X |
| 4,634,294 | 1/1987 | Christol et al. | 374/129 X |
| 4,722,612 | 2/1988 | Junkert et al. | 374/124 |
| 4,734,553 | 3/1988 | Noda | 374/129 X |
| 4,784,149 | 11/1988 | Berman et al. | 128/664 |
| 4,790,324 | 12/1988 | O'Hara et al. | 128/664 |
| 4,797,840 | 1/1989 | Fraden | 128/736 X |
| 4,858,615 | 8/1989 | Meinema | 128/736 X |
| 4,881,823 | 11/1989 | Tanaka et al. | 374/126 |
| 4,900,162 | 2/1990 | Beckman et al. | 128/664 X |
| 4,986,669 | 1/1991 | Yamaguchi | 374/107 |
| 4,993,419 | 2/1991 | Pompei et al. | 128/664 |
| 5,012,813 | 5/1991 | Pompei et al. | 128/664 |
| 5,015,102 | 5/1991 | Yamaguchi | 374/107 |
| 5,017,018 | 5/1991 | Iuchi et al. | 374/130 |
| 5,018,872 | 5/1991 | Syszynshi et al. | 374/133 |

FOREIGN PATENT DOCUMENTS

| | | |
|---|---|---|
| 0301652 | 1/1989 | European Pat. Off. . |
| 121728 | 5/1989 | Japan ................. 374/126 |

Primary Examiner—Stuart S. Levy
Assistant Examiner—Joseph A. Rhoa
Attorney, Agent, or Firm—Fulwider Patton Lee & Utecht

[57] ABSTRACT

An infrared detector receives infrared energy from the target and provides a detector signal based primarily on the difference between the infrared detector temperature and the temperature of the reference temperature area of the detector. A contact temperature measurement device provides a reference signal which is a function of the temperature of the reference temperature area of the detector. A processor receives the detector and reference signals and combines the two signals in a non-linear manner to result in a signal which is representative of the temperature of the target. The method of non-linearly combining includes the use of gain and offset terms which may be altered to a limited extent by a technician in the field with a blackbody calibration source. As a result of the recalibration, accurate target temperature measurements are continually provided. Additionally, the method of non-linearly combining includes the use of additional gain and offset terms which are adjusted to account for the infrared radiation characteristics of an anatomical target as compared to blackbody calibration source targets. Temperature is determined by combining a polynomial function of the detector with a polynomial function of the reference signal.

28 Claims, 6 Drawing Sheets

SYSTEM AND METHOD FOR TEMPERATURE DETERMINATION AND CALIBRATION IN A BIOMEDICAL PROBE

This application is a continuation, of application Ser. No. 07/492,655, filed Mar. 12, 1990, now abandoned.

BACKGROUND OF THE INVENTION

1. Field of the Invention

This invention relates generally to biomedical thermometers, and more particularly, to improvements in infrared thermometers for measuring body temperature.

2. Description of Related Art

Infrared thermometers have become useful in the medical community and permit the rapid measurement of a patient's temperature. Various approaches have been developed to make the infrared thermometer more accurate. One prior approach involves alternately sensing the radiation from an inner reference area and the target through the same optical path in order to obtain a more accurate temperature measurement. Another type of approach involves the use of a chopper unit to calibrate the thermometer. In the case of infrared thermometers which use a thermopile as the infrared detector, approaches specific to thermopile accuracy have been developed.

Typically, thermopile detectors which are used to measure infrared radiation produce an output voltage which increases as a non-linear function of the difference between the temperature of the heat sensing area in the detector and the temperature of the cold junctions of the detector. Thermopile detectors are commonly used for the measurement of extremes of temperatures, such as in detecting the temperature of a furnace, or in detecting fire. In the case of the application of the thermopile detector to infrared thermometry for the measurement of human body temperature, the temperature range is relatively narrow when compared to typical thermopile applications. Because of this narrow temperature range, techniques to improve accuracy of the thermopile detector have been under consideration.

It has been found that changes in the ambient temperature affect the temperature of the cold junctions which in turn can affect the accuracy of the thermopile output unless the temperature of the cold junctions is considered appropriately. One method used to improve the accuracy of patient temperature measurement with the thermopile detector is to maintain the cold junctions at a constant temperature by heating them to a predetermined temperature which is above the ambient temperature, or cooling them to a temperature below ambient. However, this method requires a heat source, power for the heat source and techniques for the precise regulation of the temperature of the heat source.

An ideal thermopile detector generates an output voltage that is related to the target's temperature and the temperature of the cold junctions by the following formula which was derived from the fundamental Stefan-Boltzmann law:

$$V_d = M \cdot (T_{BB}^4 - T_{CJ}^4)$$

where $V_d$ is the thermopile detector output voltage, $T_{BB}$ is the target temperature (in this case a blackbody), $T_{CJ}$ is the temperature of the cold junctions, and M is a constant.

In actual practice however, there exist many factors which alter this ideal relationship. One factor is that our knowledge of the temperature of the cold junctions, $T_{CJ}$, is typically subject to error. In most cases, a contact temperature sensor for the cold junctions is removed from the cold junctions somewhat thus making its temperature measurement inaccurate to some extent. Additionally, M is not truly constant and often depends upon the ambient temperature or the age of the detector or other factors.

A prior method for determining the blackbody target temperature $T_{BB}$ from the output signal $V_d$ of a thermopile detector and the temperature of the thermopile detector cold junctions $T_{CJ}$ was by the following equation involving a polynomial series:

$$T_{BB} = T_{CJ} + A_1 \cdot V_d + A_2 \cdot V_d^2 + A_3 \cdot V_d^3 + A_4 \cdot V_d^4 + \ldots$$

By manipulating the equation, it can be seen that the polynomial series in the thermopile detector output voltage equals $T_{BB} - T_{CJ}$. However, it has been observed that this voltage is actually more dependent on the $T_{CJ}$ term than this equation indicates. It has been observed that even if $T_{BB}$ changes the same amount that $T_{CJ}$ changes, in actual practice $V_d$ will not remain the same. By not accounting for this occurrence, accuracy will be adversely affected.

Thus it would be desirable to provide a method and a system for enhancing the accuracy of the output signal of a detector by considering the cold junction temperature or temperature of the reference temperature area of the detector more fully.

The tympanic membrane is generally considered by the medical community to be superior to other sites for taking a patient's temperature. The same blood source which supplies the hypothalamus, the organ which regulates body temperature, also supplies the tympanic membrane and thus the temperature of the tympanic membrane is closely correlated to the core temperature. However, the tympanic membrane is not directly accessible; it does not lie in a straight path from the ear opening. Therefore, obtaining infrared energy from only the tympanic membrane and not from surrounding tissues, such as the ear canal, is difficult when merely inserting an instrument into the ear opening. Yet it is desirable to be able to measure a patient's temperature in this manner; quickly and non-intrusively. Whether the temperature detector is a thermopile or another type of detector, some adjustment of its output may be necessary to more accurately indicate the temperature of the tympanic membrane. Additionally, it would be desirable to determine the temperature of a particular part of a patient's anatomy, such as the core, the temperature of which may be accurately correlated with the temperature of an infrared target part of anatomy, such as the tympanic membrane, by measuring the temperature of the target and adjusting that temperature as necessary to indicate the temperature of the other part of the anatomy.

It would be desirable to provide a method and system which provide accurate temperature measurements of a patient's anatomy over a wide temperature range without requiring the application of a heat source or a cold source to the detector.

For continued accuracy of the instrument, it would also be desirable to provide a method and system allowing re-calibration of the biomedical thermometer periodically in the field. The present invention addresses these needs.

SUMMARY OF THE INVENTION

Briefly, and in general terms, the present invention provides a new and improved method and system for accurately determining the temperature of a target from infrared energy received from the target by an infrared thermometer and for calibrating the infrared thermometer. By use of calibration data, the present invention also provides a means for the thermometer to indicate the temperature of another part of the anatomy based on the infrared energy received from the target part of the anatomy.

In accordance with the invention, by way of example, an infrared detector of the thermometer receives infrared energy from the target and provides a detector signal based on both the temperature of the heat sensing portion of the infrared detector temperature and the temperature of the reference temperature area of the detector. A contact temperature measurement device provides a reference signal which is a function of the temperature of the reference temperature area of the detector. In accordance with the invention, not only is the temperature difference between the infrared sensing portion of the detector and the reference temperature area considered, but the absolute temperature of the reference temperature area is also considered. A processor receives the detector and reference signals and combines the two signals in a non-linear manner to result in a signal which is representative of the temperature of the target.

Additionally, the processor contains calibration data and combines the detector signal and the reference signal in a manner dependent upon whether the temperature of a blackbody calibration source is desired or the temperature of an anatomical target. The processor may also contain other calibration data and combines the detector signal and reference signal in a manner dependent upon whether the temperature of the target is desired or the temperature of some other part of the anatomy.

As a further feature of the invention, means are provided for the user to re-calibrate the system with a blackbody calibration source and to modify the processor calibration data to a limited extent. This re-calibration permits compensation for changes in the instrument due to aging, usage and other reasons.

The new and improved thermometry system of the present invention is extremely accurate, reliable and easy to use in providing enhanced calibration and measurement capabilities.

These and other aspects and advantages of the invention will become apparent from the following more detailed description, when taken in conjunction with the accompanying drawings of illustrative embodiments.

DESCRIPTION OF THE PREFERRED EMBODIMENT

Figure 1:
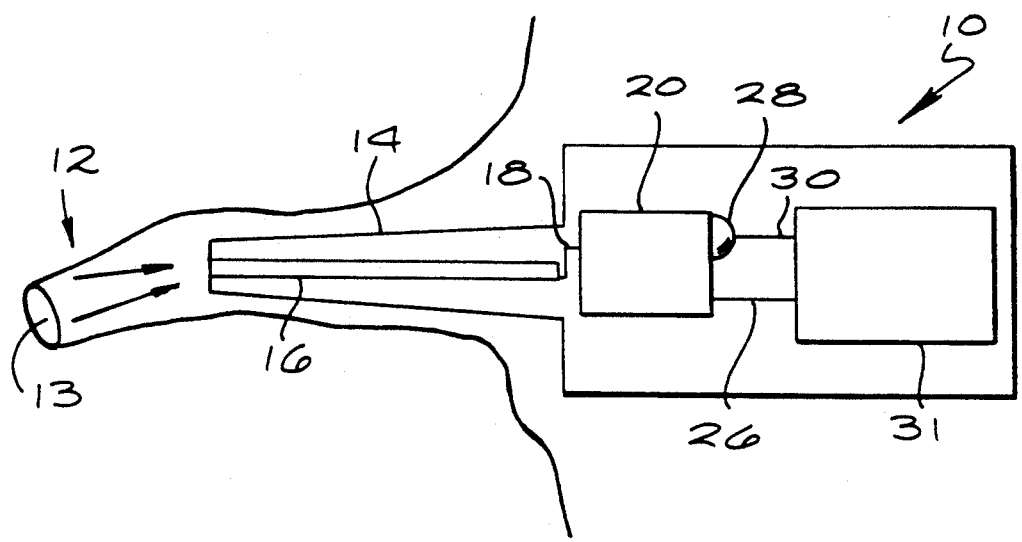
FIG. 1 is a diagram of the infrared thermometry system in accordance with the invention.

As shown in the exemplary drawings and referring with particularity to FIG. 1, the present invention is embodied in an infrared thermometry system 10 which is generally shown in the form of a hand held probe for measuring the temperature of a target area 12 such as the ear canal and tympanic membrane 13. The infrared thermometer includes a probe end 14 which is adapted to be inserted partially into the ear canal, and which covers and protects a waveguide 16 of the thermometer which receives and communicates infrared energy to the instrument.

The infrared thermometer may include an optical chopper flag 18 which operates to allow the infrared thermometer to measure the infrared radiation entering through the waveguide from the target, and to also measure a background signal level generated by the instrument itself, such as radiation and electronic offset, in order to gain a more accurate measure of the amount of infrared radiation entering the instrument. The optical chopper flag admits the incoming infrared radiation to the detector 20, typically a thermopile, which is shown schematically in greater detail in FIG. 2.

Figure 2:
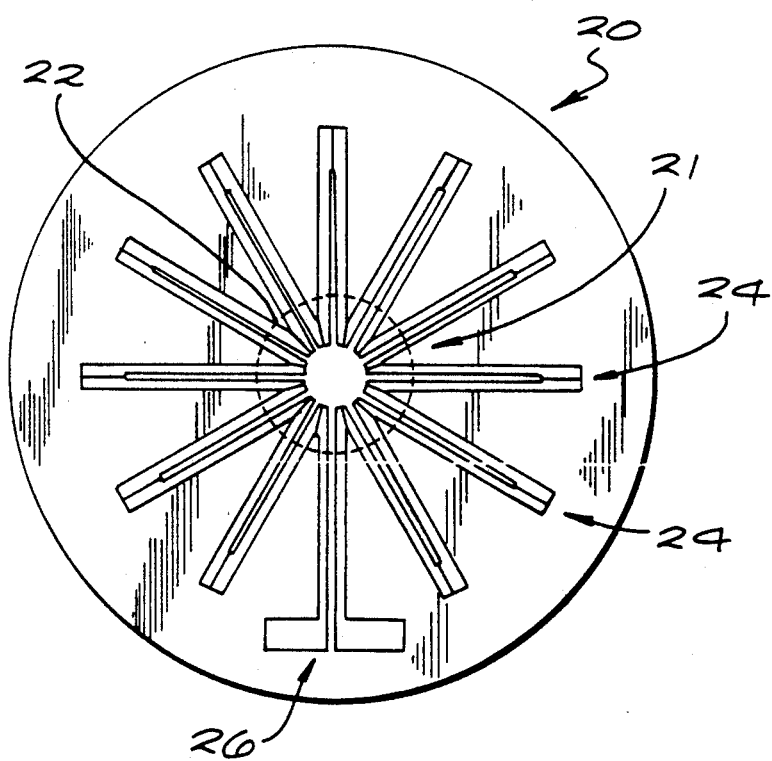
FIG. 2 is a diagram of a thermopile detector of an infrared thermometry system of FIG. 1, illustrating the heat sensing portion and cold junctions.

The thermopile detector includes an infrared energy sensing area 22, which typically includes a blackened area for absorption of infrared energy and hot junctions 21. The construction of a thermopile is based upon the basic construction of a thermocouple, which is generally made of dissimilar metals chosen to give a large thermoelectric output in response to a temperature differential in the thermocouple. Thus, as is shown in FIG. 2, the thermopile detector is constructed of many thermocouples joined at one end at the heat sensing area, with the opposite ends serving as cold junctions, two of which are indicated by numeral 24, in the reference temperature area. The electrical output signal is then communicated to signal processing means 31 in the infrared thermometer via the thermopile electrical signal lines 26.

The thermopile infrared detector 20 produces an output voltage which is generally a non-linear function of both the temperature of the cold junctions 24 and the temperature of the infrared energy sensing area 22 of the thermopile detector. The temperature of the cold junctions 24 of the detector 20 is preferably measured with a precision contact temperature measurement device such as a thermistor 28, which is typically disposed in intimate physical and thermal contact with the cold junction area 24 associated with the thermopile detector. The thermistor 28 generates a reference signal representative of the temperature of the cold junctions which is carried by the electrical lines 30 to the signal processing means 31.

The temperature of the cold junctions may be the ambient temperature but it may also be higher or lower than ambient temperature. In regard to a thermopile detector, the reference signal is representative of the temperature of the cold junctions. In regard to other detectors, the reference signal is representative of the temperature of the reference temperature area of the detector.

Figure 3:
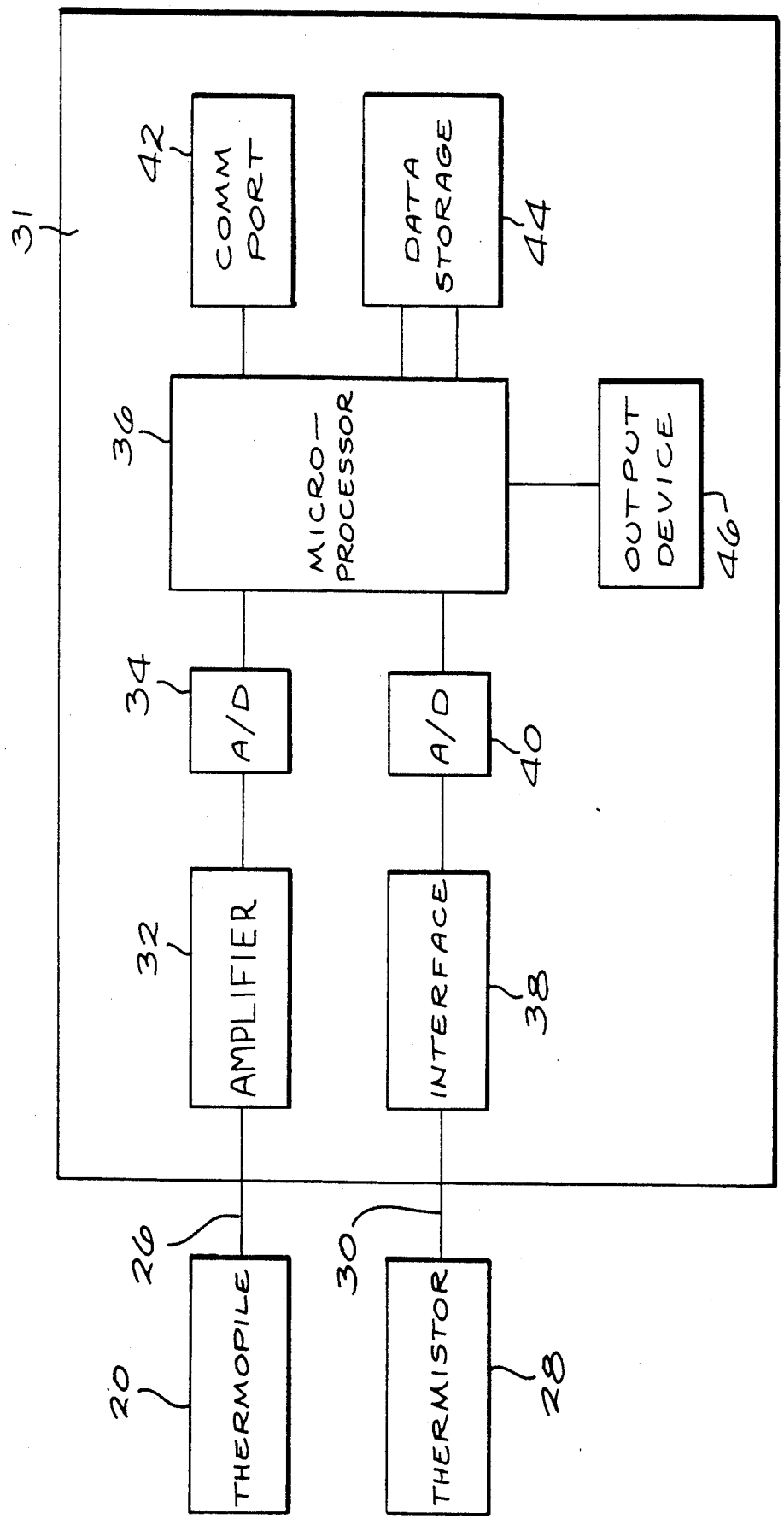
FIG. 3 is a block diagram of the signal processing circuitry of the infrared thermometry system of FIG. 1.

With reference to FIG. 3, the signal from the thermopile detector 20 is preferably amplified 32 and is then converted to digital form by an analog-to-digital converter 34, to be received by the microprocessor 36. The thermistor 28 is interfaced to an analog-to-digital converter 40 by interface 38. This reference signal, $V_{ref}$, which is representative of the temperature of the cold junctions $T_{CJ}$, and is ideally a known stable temperature, is also received by the microprocessor 36. The mathematical relationship between $T_{CJ}$ and $V_{ref}$ is typically supplied by the thermister manufacturer and thus $T_{CJ}$ is easily computed by the microprocessor.

The microprocessor 36 provides means to calibrate the system with a blackbody calibration source in laboratory-type conditions, it provides means to re-calibrate the system with a blackbody calibration source under other conditions and it provides means to use the system to take temperature measurements of a target or of another part of the anatomy based on the temperature of a target. To accomplish the above, calibration data is stored in the system, such as in the data storage element 44. In order to communicate externally with the microprocessor 36 and the data storage element 44, a communications port 42 is preferably provided in the infrared thermometer. Through this port 42, calibration constants may be received by the microprocessor for storage in the data storage element 44 which may take the form of a non-volatile memory such as an EEPROM. Additionally, the port may be used to inform the microprocessor 36 that it is now being calibrated with a blackbody calibration source of a particular temperature. As used in this description, a blackbody calibration source is defined as a standardized temperature reference source having a precisely known temperature and precisely known radiation characteristics.

Preferably, the data storage element 44 has an electrically erasable memory that can be write enabled for storage of data with sufficient precision. A typical EEPROM memory used for data storage allows storage of the data and calibration constants in the form of up to sixty-four 16-bit words. The microprocessor 36 is preferably of the type capable of performing arithmetic operations, such as are currently commercially available, and is operatively connected to an output device 46 such as a liquid crystal display (LCD) or light emitting diode (LED) display unit for example, for displaying the temperatures determined by the thermometer.

It has been found that the output voltage of a thermopile detector 20 is affected in a non-linear manner by changes in temperature of the cold junctions 24. Combining in a non-linear manner a signal which is representative of the temperature of the cold junctions over a given temperature range, or in the case of detectors other than thermopiles, a signal representative of the temperature of the reference temperature area, results in greatly improved accuracy. The non-linear combining may be expressed as a polynomial series. This has been found to significantly improve the accuracy of temperature measurements and obviates the need for heating or cooling the cold junctions in an attempt to maintain a constant temperature of the cold junctions.

Figure 4:
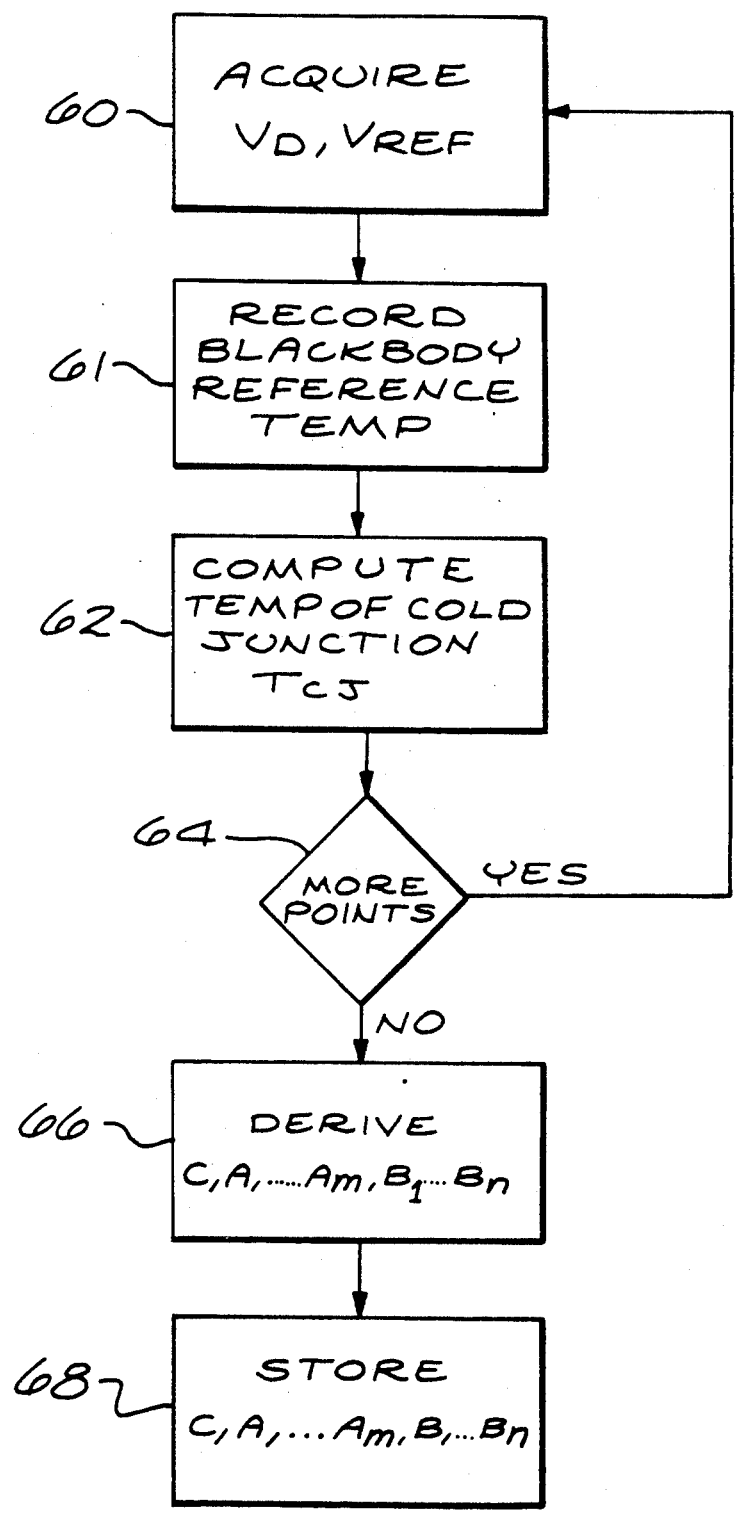
FIG. 4 is a flow chart of the factory calibration of an infrared thermometry system in accordance with the invention.

Referring now to FIG. 4, calibration of the system with a blackbody calibration source of temperature $T_{BB}$ under factory or laboratory conditions is shown. The quantity $V_d$ is the digital signal representative of the output voltage of the thermopile or, in the case of a system with an optical chopper, $V_d$ is the digital signal representative of the difference between the thermopile output voltage with the chopper open and the thermopile output voltage with the chopper closed. The detector signal $V_d$ is acquired 60 and the reference thermistor signal $V_{ref}$, representative of the temperature of the cold junctions $T_{CJ}$, is acquired 60. The temperature of the blackbody calibration source is recorded 61 and the temperature of the cold junctions $T_{CJ}$ is computed 62 based on the signal $V_{ref}$. These data may be acquired at numerous points over the specified usable target and ambient temperature ranges of the thermometer 64. Determination of the temperature of the blackbody reference source can be closely approximated with an expression utilizing the thermopile signal $V_d$ and the cold junction temperature $T_{CJ}$ as follows:

$$T_{BB1} = C + A_1 \cdot V_d + A_2 \cdot V_d^2 + A_3 \cdot V_d^3 + A_4 \cdot V_d^4 + \ldots \\ + A_m \cdot V_d^m + B_1 \cdot T_{CJ} + B_2 \cdot T_{CJ}^2 + B_3 \cdot T_{CJ}^3 + \ldots \\ B_n \cdot T_{CJ}^n$$

where C, a calibration constant, the thermopile voltage calibration coefficients $A_1 \ldots A_m$ and the cold junction temperature calibration coefficients $B_1 \ldots B_n$ are obtained by multi-variable linear regression 66, or other means, based on data provided by the manufacturers of the thermopile detector and/or laboratory measurements of thermopile output ($V_d$) generated from testing with a blackbody calibration source over a range of target and ambient temperatures. This constant and the coefficients are stored 68 in the data storage element 44.

Laboratory testing over a range of target and ambient temperatures permits accurate determination of the constant C and coefficients $A_1 - A_m$, and $B_1 - B_n$ which will be used in measuring temperatures of targets. The actual values of this constant and these coefficients will vary with each particular detector. Also, the number of coefficients necessary will vary with each particular application. In one embodiment, the thermometer was to be used over a temperature range of about 25° C. (77° F.) to about 43° C. (110° F.) and the thermistor was to operate in the temperature range of from about 15° C. (60° F.) to about 43° C. (110° F.). Exemplary values of C=2.4 degrees C, $A_1$=77.5, $A_2$=−14.4, $A_3$=8.6, $A_4$=−32.1, $B_1$=0.85, $B_2$=0.0026, and $B_3$=−5.0×10$^{-6}$ are illustrative. It was found that it was unnecessary to include any higher order terms in the expression for $T_{BB1}$ above in this embodiment in order to provide a sufficiently accurate fit to the collected data.

Figure 5:
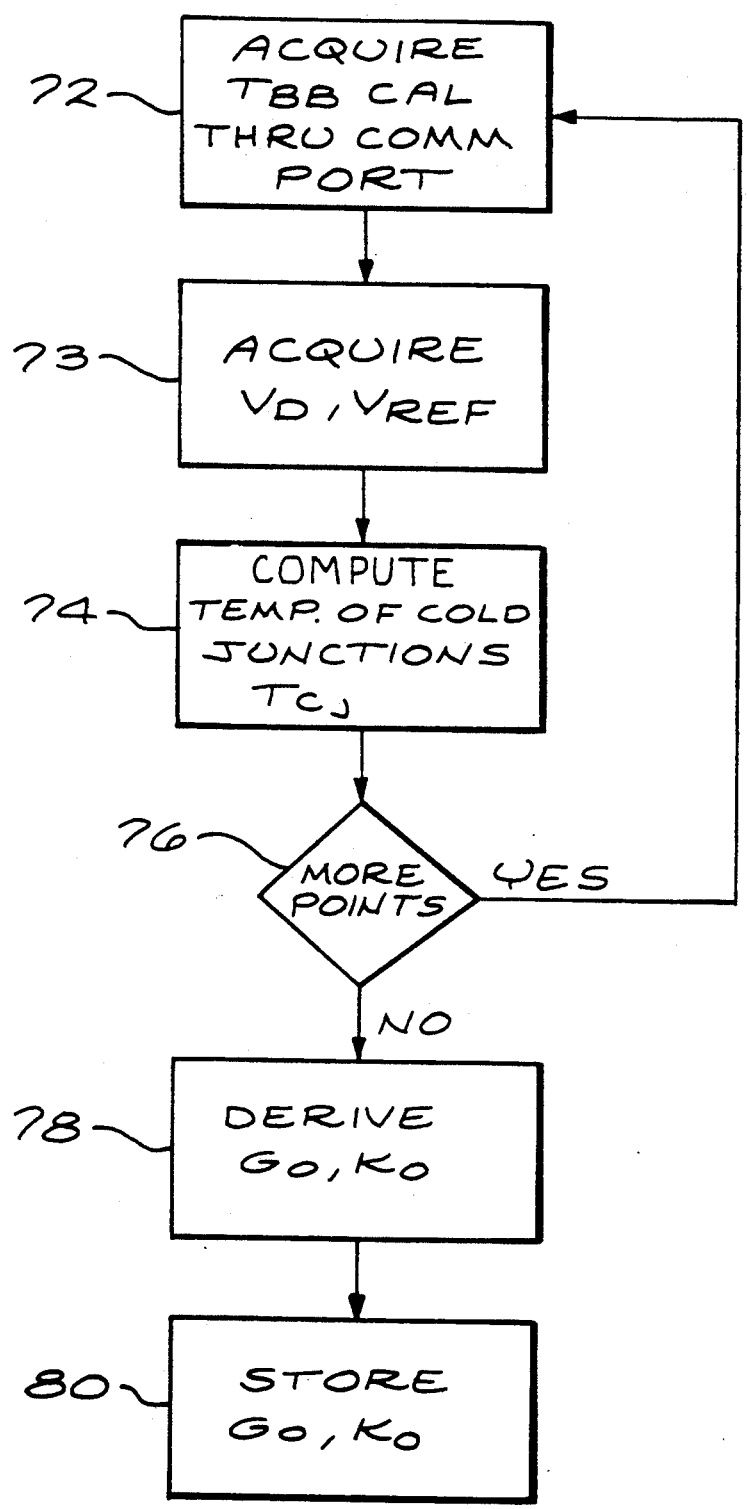
FIG. 5 is a flow chart of the field calibration of an infrared thermometry system in accordance with the invention.

Also provided is a means to re-calibrate the thermometer in the field with a blackbody calibration source. In order to correct changes in instrument readings due to electrical component drift, such as in the amplifier which amplifies the detector output voltage before it is sent to the analog to digital converter, or to correct minor changes in the optical components of the instrument, an instrument technician will often wish to either re-calibrate the instrument or check its calibration with a blackbody source. Means are provided to switch the thermometer into the re-calibration mode and transmit to the microprocessor data necessary for recalibration. Referring now to FIG. 5, in the re-calibration mode the blackbody calibration source $T_{BB}$ temperature data is input 72 to the system through the port 42. The detector signal $V_d$ is acquired 73 and the reference thermistor signal $V_{ref}$ representative of the temperature of the cold junctions $T_{CJ}$ is acquired 73. The temperature of the cold junctions $T_{CJ}$ is computed 74. These data may be acquired at two or more points over the specified usable temperature range of the thermometer 76. The temperature calibration additive constant C, the thermopile polynomial calibration coefficients $A_1$ through $A_m$, and the cold junction temperature calibration coefficients $B_1$ through $B_n$ have already been determined in the factor or laboratory setting. In re-calibrating the thermometer, limited adjustment is provided as expressed by the following formula:

$$T_{BB} = K_0 + C + [A_1(G_0 \cdot V_d) + A_2(G_0 \cdot V_d)^2 + A_3(G_0 \cdot V_d)^3 + A_4(G_0 \cdot V_d)^4 + \ldots + A_m(G_0 \cdot V_d)^m] + [B_1 \cdot T_{CJ} + B_2 \cdot T_{CJ}^2 + B_3 \cdot T_{CJ}^3 + \ldots + B_n \cdot T_{CJ}^n]$$

This formula, although very similar to the formula utilized in calibrating during a laboratory calibration sequence, includes a gain term $G_0$, and an offset term $K_0$. When the instrument is calibrated in the laboratory or the factory, the gain term $G_0$ will be arbitrarily set to 1, and the additive calibration offset term $K_0$ will be arbitrarily set to zero. When an instrument technician later regularly re-calibrates the instrument, $K_0$ and $G_0$ are determined 78 by algebraic iteration or other means, and stored in the data memory 80 to reflect any minor drifts in calibration, which may for example be due to aging of the instrument, or exposure of the infrared thermometer to shock or temperature extremes. In a preferred embodiment, the temperature of the blackbody calibration source is input through the communications port 42 and the microprocessor 36 itself will determine and store the constants $K_0$ and $G_0$. $K_0$ is typically in the range of $\pm 2°$ C., and $G_0$ is typically in the range of from 0.3 to 1.5. It would also be possible for the instrument technician to independently determine the necessary corrections of these terms and to input them through the communications port 42. In a preferred embodiment, re-calibration is accomplished by acquiring data at two blackbody target temperatures approximately 25° and approximately 37° under room temperature ambient conditions. $K_0$ is determined based on data acquired at the lower of the two target temperatures and $G_0$ is calculated based on the data acquired at the higher of the two target temperatures.

In the cases of both factory calibration and field re-calibration, such procedures will preferably be accomplished without the use of a protective probe cover in order to minimize the effects of unit to unit variability in probe cover characteristics.

Blackbody calibration sources typically present somewhat different environments from that experienced with anatomical targets. Typically some adjustment of the instrument is necessary to achieve accurate results with anatomical targets. Additionally, it has been found that in order to correlate the body core temperature of a patient with the temperature measured in the ear, further adjustment is necessary, as well as for the presence of the probe cover. Although during normal instrument calibration the probe cover will not be in place, the probe cover, which may have characteristics which will vary slightly from probe cover to probe cover, will necessarily be in place during measurement of patient temperature. Physiological conditions which may vary from patient to patient are also a factor. Three additional terms have therefore been found useful in determination of the body core temperature $T_C$, which can be computed as follows:

$$T_C = K_0 + C + K_1 + G_1[A_1(G_0 \cdot V_d) + A_2(G_0 \cdot V_d)^2 + A_3(G_0 \cdot V_d)^3 + A_4(G_0 \cdot V_d)^4 + \ldots + A_m(G_0 \cdot V_d)^m] + G_2[B_1 \cdot T_{CJ} + B_2 \cdot T_{CJ}^2 + B_3 \cdot T_{CJ}^3 + \ldots + B_n \cdot T_{CJ}^n]$$

$K_1$ is a further additive temperature calibration offset term, and $G_1$ and $G_2$ are additional multiplier gain terms reflecting the effects of patient ear physiology and the presence of a probe cover which may be determined from clinical testing of the instruments. It is estimated that $K_1$ will typically be in the range of from 1°–2° C., but should not be more than 3°–4° C., and that $G_1$ and $G_2$ should be generally close, but not equal to 1.

Figure 6:
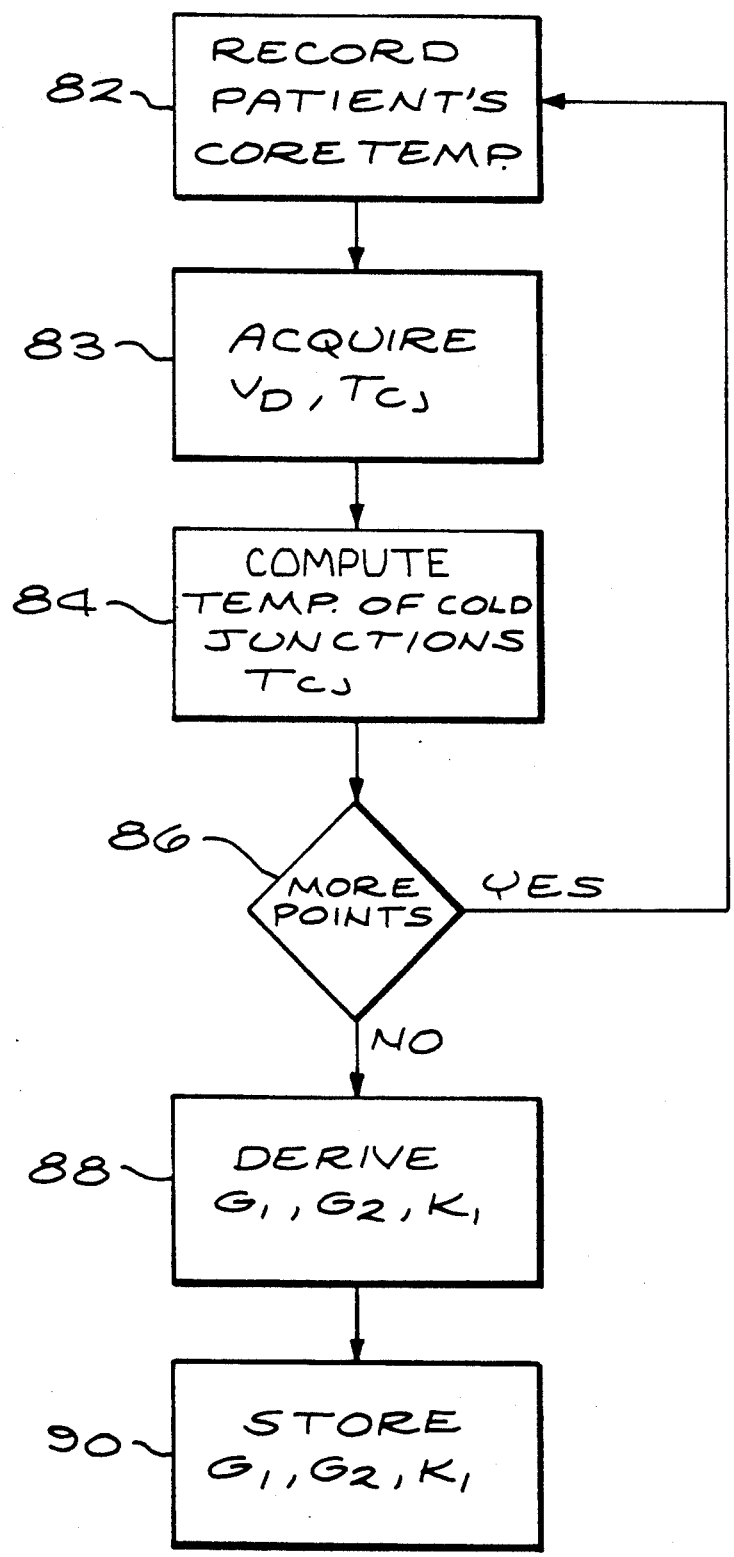
FIG. 6 is a flow chart of the calibration of an infrared thermometry system to take into account anatomical characteristics.

The terms $K_1$, $G_1$, and $G_2$ may be derived from actual testing of patients with pulmonary artery catheters, providing a preferred standardized measure of patient core temperature. Referring now to FIG. 6, the patient's actual temperature measured from such a catheter or other means is recorded 82. The detector signal $V_d$ and the reference signal $V_{ref}$ representative of the temperature of the cold junctions $T_{CJ}$ are acquired 83. The temperature of the cold junctions $T_{CJ}$ is computed 84. These data may be acquired at numerous points over the specified usable temperature range of the thermometer 86. The terms $K_1$, $G_1$, and $G_2$ may then be derived by multi-variable linear regression or other means. The new terms $K_1$, $G_1$, and $G_2$ are then stored 90 and are applied to temperature measurements made with the thermometry system. These additional three terms, $K_1$, $G_1$ and $G_2$ allow for increased accuracy of the instrument in determining a core temperature $T_C$.

Although in the above case the body core temperature was determined from temperature measurements of the ear, the principles may be applied to determining the temperature of other parts of the anatomy based on the temperature of targets, which may include targets other than the ear. By correlating the temperature data of the two parts of the anatomy and by setting offset and gain appropriately, such as $K_1$, $G_1$ and $G_2$, such other temperature measurements may be accomplished.

Figure 7:
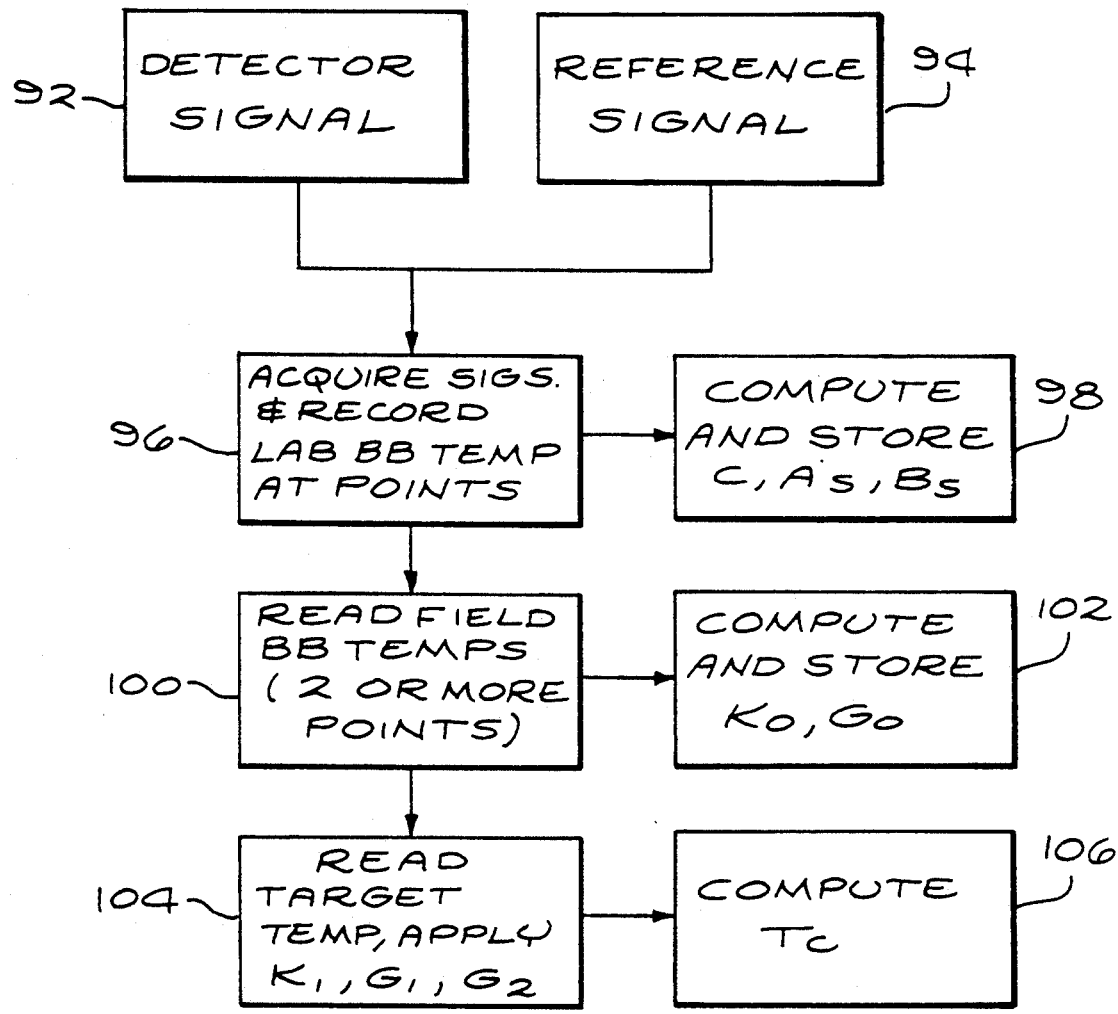
FIG. 7 is a flow chart of the overall calibration and temperature measurement modes of a thermometry system in accordance with the principles of the invention.

Referring now to FIG. 7, a flow chart showing the modes of an embodiment of the thermometry system is presented. The detector signal 92 and the reference signal 94 which is representative of the temperature of the reference temperature area of the detector are read 96 and the blackbody calibration source temperature data is input 96 and the constant C and the A and B coefficients are derived 98 and stored in the data storage element. In the case of field re-calibration, the blackbody calibration source temperature data is input into the microprocessor 100 and the offset ($K_0$) and gain ($G_0$) are computed and stored 102. In measuring temperature of a patient, the target temperatures are read, the appropriate offset ($K_1$) and gains ($G_1$ and $G_2$) are applied 104 and the temperature computed 106.

Thus as a result of the method and system of the invention in calibrating a thermometry system and measuring the temperatures of targets, improved accuracy can be obtained in an infrared thermometer without resort to stabilizing the reference temperature area of the infrared detector such as by means of a heat or cold source. Additionally, field re-calibration is made possible with the invention.

It should be recognized that although the method and system of the invention have been described with reference to a digital signal processor, the invention may also be implemented with analog signal processing of signals from the thermopile infrared detector and cold junction temperature detector, and hardware implementation of the various additive and multiplicative gain constants, as is within the ability of those skilled in the art.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. A thermometry system for providing a temperature signal representative of the temperature of a first target derived from the infrared energy received from the first target, comprising:

detector means having an infrared sensing area for receiving the infrared radiation from the first target and having a reference temperature area, the detector means providing a steady state detector signal which is a function of the temperature of the infrared sensing area and of the reference temperature area;

sensor means for providing a reference signal which is a function of the temperature of the reference temperature area;

processor means for providing a first polynomial function of the detector signal having a plurality of non-zero terms, for providing a second polynomial function of the reference signal having a plurality of non-zero terms, for combining the first polynomial function with the second polynomial function and for providing the temperature signal based on said combination.

2. The thermometry system of claim 1 further comprising communication means for use in recalibrating the thermometer system with at least one reference source of known temperature, the communication means for receiving the known temperature of each of the reference sources, wherein said processor determines calibration data from a comparison of the known temperature of the at least one reference source and the temperature of the reference source as provided by the thermometry system and applies said calibration data in providing the temperature signal.

3. The thermometry system of claim 1 further comprising:

data storage means for storing a first offset term and first and second gain terms which are derived from characteristics of the first target;

wherein before combining the first polynomial with the second polynomial, the processor means multiplies the entire first polynomial function by the first gain term and multiplies the entire second polynomial function by the second gain term and after combining the first and second polynomials, adds the first offset term to the combination.

4. The thermometry system of claim 3 wherein the thermometry system is also for determining the temperature of a second target having a known relationship to the temperature of the first target, the second target being located at a position removed from the first target, based on the temperature of the first target wherein the first offset term and first and second gain terms are derived from differences between the first target and the second target.

5. The thermometry system of claim 3 wherein the data storage means is also for storing a second offset term and a third gain term which are derived from re-calibrating the thermometry system with at least one reference source each of which has a known temperature and the processor means is also for applying the third gain term to each term of the first polynomial function and for applying the second offset term to the combination.

6. The thermometry system of claim 5 further comprising communication means for receiving the known temperature of each of the at least one reference sources and providing the known temperature to the data storage means wherein the processor means computes the second offset and third gain terms from the difference between the stored known temperature of the at least one reference source and the temperature of the reference source as provided by the thermometry system.

7. The thermometry system of claim 5 further comprising communication means for receiving the second offset and third gain recalibration terms from an external data source and providing said terms to the data storage means wherein the processor means applies said externally received second offset and third gain recalibration terms in providing the temperature signal.

8. The thermometry system of claim 1 wherein the first polynomial function comprises a power series of the detector signal and the second polynomial function comprises a power series of the reference signal.

9. The thermometry system of claim 8 wherein the detector means comprises a thermopile.

10. A thermometry system for providing a temperature signal representative of the temperature of a first target derived from the infrared energy received from the first target, comprising:

detector means having an infrared sensing area for receiving the infrared radiation from the first target and having a reference temperature area, the detector means providing a steady state detector signal which is a function of the temperature of the infrared sensing area and of the reference temperature area;

sensor means for providing a reference signal which is a function of the temperature of the reference temperature area;

data storage means for storing a first offset term and first and second gain terms which are based on characteristics of the first target;

communication means for use in recalibrating the thermometer system with at least one reference source of known temperature, the communication means for receiving the known temperature of the at least one reference source; and processor means for providing a first polynomial function of the detector signal having a plurality of non-zero terms and applying the first gain term to the entire first polynomial function, for providing a second polynomial function of the reference signal having a plurality of non-zero terms and for applying the second gain term to the entire second polynomial function, for determining calibration data from a comparison of the known temperature of the at least one reference source and the detector signal, for combining the first polynomial function with the second polynomial funtion and for applying the first offset and the calibration data to said combination, and for providing a temperature signal based on said combination.

11. The thermometry system of claim 10 wherein the data storage means is also for storing a second offset term and a third gain term which are derived from re-calibrating the thermometry system with the at least one reference source having a known temperature, and the processor means is also for applying the third gain term to each term of the first polynomial function and for applying the second offset term to the combination.

12. The thermometry system of claim 10 wherein the processor means computes the second offset and third gain terms from the differences between the stored known temperature of the at least one reference source and the temperature of the reference source as provided by the thermometry system.

13. The thermometry system of claim 10 wherein said communication means receives the second offset and third gain terms from an external data source and provides said terms to the data storage means and wherein the processor means applies said externally received second offset and third recalibration gain terms in providing the temperature signal.

14. The thermometry system of claim 10 wherein the thermometry system is for also determining the temperature of a second target having a known relationship to the temperature of the first target, the second target being located at a position removed from the first target, based on the temperature of the first target wherein the first offset term and first and second gain terms are derived from differences between the first target and the second target.

15. The thermometry system of claim 10 wherein the first polynomial function comprises a power series of the detector signal and the second polynomial series comprises a power series of the reference signal.

16. The thermometry system of claim 15 wherein the detector means comprises a thermopile.

17. A thermometry system for providing a temperature signal representative of the temperature of a first target derived from the infrared energy received from the first target, comprising:
    detector means having an infrared sensing area for receiving the infrared radiation from the first target and having a reference temperature area, the detector means providing a steady state detector signal which is a function of the temperature of the infrared sensing area and of the reference temperature area;
    sensor means for providing a reference signal which is a function of the temperature of the reference temperature area;
    data storage means for storing a first offset term and first and second gain terms derived from anatomical characteristics and for storing second offset and third gain terms derived from re-calibrating the thermometry system; and
    processor means for providing a first polynomial function of the detector signal having a plurality of non-zero terms and applying the second gain term to each term of the first polynomial function and for applying the first gain term to the entire first polynomial function, for providing a second polynomial function of the reference signal having a plurality of non-zero terms and for applying the second gain term to the entire second polynomial function, for combining the first polynomial function with the second polynomial function and for adding the first and second offset terms to the combination and for providing a temperature signal based on said combination.

18. The thermometry system of claim 17 further comprising communication means for receiving the known temperature of at least one reference source used for recalibrating the system and providing said known temperature to the data storage means wherein the processor means computes the second offset and third gain terms from the differences between the stored known temperature of the at least one reference source and the temperature of the reference source as provided by the thermometry system.

19. The thermometry system of claim 17 wherein said communication means receives the second offset and third gain recalibration terms from an external data source and provides said terms to the data storage means wherein the processor means applies said external received second offset and third gain recalibration terms in providing the temperature signal.

20. The thermometry system of claim 17 wherein the first polynomial function comprises a power series of the detector signal and the second polynomial series comprises a power series of the reference signal.

21. The thermometry system of claim 20 wherein the detector means comprises a thermopile.

22. A method for providing a temperature signal representative of the temperature of a first target derived from the infrared energy received from the first target by a detector having an infrared sensing area for receiving the infrared radiation from the first target and having a reference temperature area, comprising the steps of:
    providing a steady state detector signal which is a function of the infrared energy received by the infrared sensing area of a detector, the detector signal being a function of the temperatures of the infrared sensing area and the reference temperature area;
    providing a reference signal which is a function of the temperature of the reference temperature area;
    providing a first polynomial function of the detector signal having a plurality of non-zero terms;
    providing a second polynomial function of the reference signal having a plurality of non-zero terms;
    combining the first polynomial function with the second polynomial function; and
    providing a temperature signal based on said combination.

23. The method of claim 22 further comprising the steps of:
    deriving a first offset term and first and second gain terms from characteristics of the first target;
    storing such first offset and first and second gain terms; and
    applying the first gain term to the entire first polynomial function;
    applying the second gain term to the entire second polynomial function; and
    applying the first offset term to the combined first and second polynomials.

24. The method of claim 23 wherein the step of storing further comprises:
    deriving a second offset term and a third gain term from recalibrating the thermometry system with at least one reference source having a known temperature;

storing the second offset and third gain terms; and applying the third gain term to each term of the first polynomial function and for applying the second offset term to the combination.

25. The method of claim 24 further comprising the step of receiving the known termperature of the at least one reference source, computing the second offset and third gain terms from the differences between the known temperature of the at least one reference source and the temperature signal.

26. The method of claim 23 wherein the method is also for determining the temperature of a second target having a known relationship to the temperature of the first target, the second target being located at a position removed from the first target, based on the temperature of the first target and wherein the step of deriving the first offset and first gain terms comprises deriving said terms from differences between the first target and the second target.

27. The method of claim 22 wherein the step of providing a first polynomial function comprises providing a first power series of the detector signal and the step of providing a second polynomial function comprises providing a second power series of the reference signal.

28. The method of claim 27 wherein the detector comprises a thermopile.

* * * * *